US008986557B2

(12) United States Patent
Underwood et al.

(10) Patent No.: US 8,986,557 B2
(45) Date of Patent: Mar. 24, 2015

(54) HDD PATTERNING USING FLOWABLE CVD FILM

(71) Applicant: Applied Materials, Inc., Santa Clara, CA (US)

(72) Inventors: Brian Saxton Underwood, Santa Clara, CA (US); Abhijit Basu Mallick, Fremont, CA (US); Nitin Ingle, San Jose, CA (US); Roman Gouk, San Jose, CA (US); Steven Verhaverbeke, San Francisco, CA (US)

(73) Assignee: Applied Materials, Inc., Santa Clara, CA (US)

(*) Notice: Subject to any disclaimer, the term of this patent is extended or adjusted under 35 U.S.C. 154(b) by 0 days.

(21) Appl. No.: 14/177,893

(22) Filed: Feb. 11, 2014

(65) Prior Publication Data

US 2014/0231384 A1 Aug. 21, 2014

Related U.S. Application Data

(60) Provisional application No. 61/766,197, filed on Feb. 19, 2013.

(51) Int. Cl.
*B44C 1/22* (2006.01)
*G11B 5/85* (2006.01)
*G11B 5/855* (2006.01)

(52) U.S. Cl.
CPC . *G11B 5/85* (2013.01); *G11B 5/855* (2013.01)
USPC .................................................. 216/22; 438/3

(58) Field of Classification Search
CPC ........ G11B 5/855; G11B 5/743; H01F 41/32; H01F 41/34; B82Y 10/00
USPC .................................................. 216/22; 483/3
See application file for complete search history.

(56) References Cited

U.S. PATENT DOCUMENTS

| 7,498,273 | B2 | 3/2009 | Mallick et al. |
| 7,745,352 | B2 | 6/2010 | Mallick et al. |
| 7,943,531 | B2 | 5/2011 | Nemani et al. |
| 8,852,962 | B2 * | 10/2014 | Verhaverbeke et al. .......... 438/3 |
| 2007/0231949 | A1 | 10/2007 | Huber et al. |
| 2010/0079901 | A1 | 4/2010 | Fukushima |
| 2012/0196155 | A1 | 8/2012 | Bencher et al. |
| 2013/0004763 | A1 | 1/2013 | Feldbaum et al. |

* cited by examiner

Primary Examiner — Roberts Culbert
(74) Attorney, Agent, or Firm — Patterson& Sheridan, LLP

(57) ABSTRACT

Method and apparatus for forming a patterned magnetic substrate are provided. A patterned resist is formed on a magnetically active surface of a substrate. An oxide layer is formed over the patterned resist by a flowable CVD process. The oxide layer is etched to expose portions of the patterned resist. The patterned resist is then etched, using the etched oxide layer as a mask, to expose portions of the magnetically active surface. A magnetic property of the exposed portions of the magnetically active surface is then modified by directing energy through the etched resist layer and the etched oxide layer, which are subsequently removed from the substrate.

16 Claims, 5 Drawing Sheets

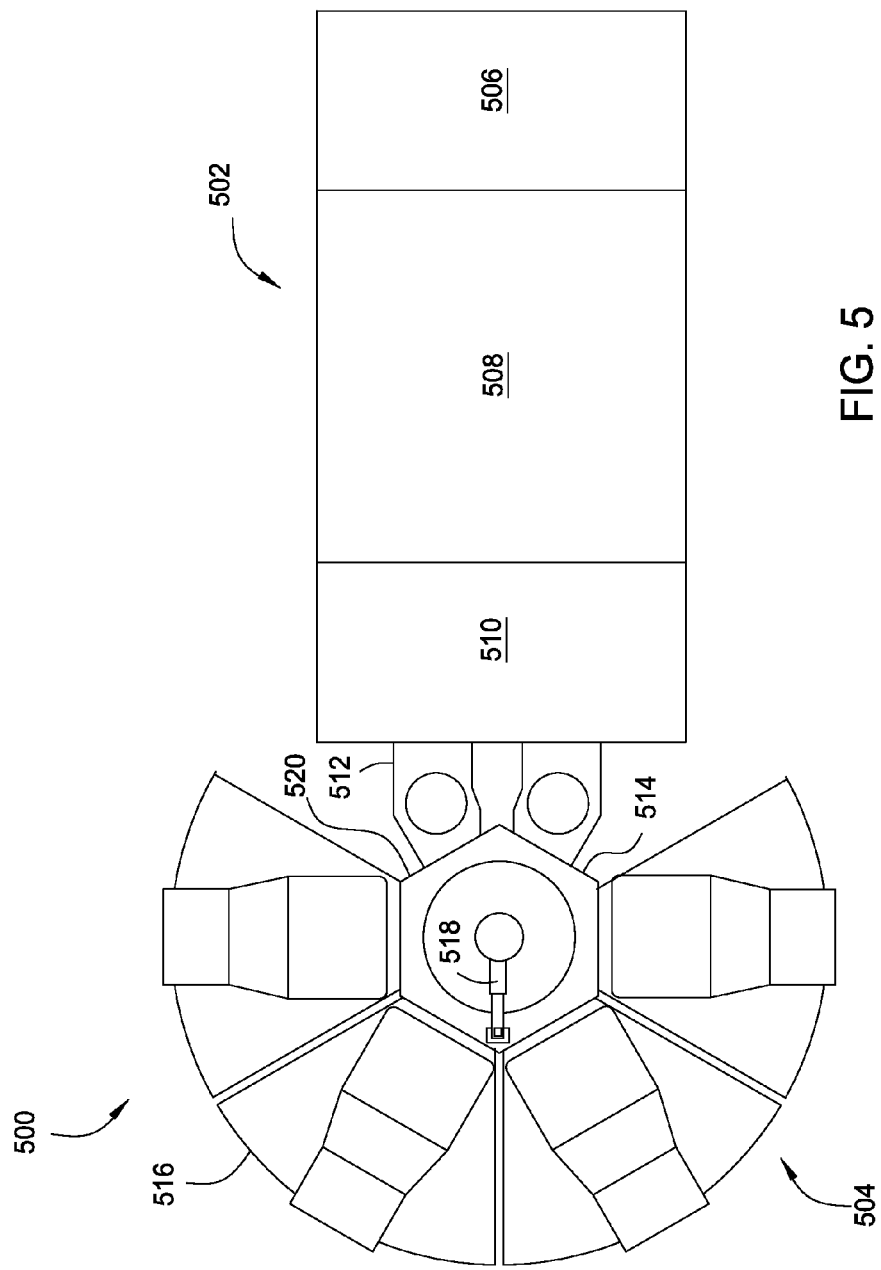

US 8,986,557 B2

HDD PATTERNING USING FLOWABLE CVD FILM

CROSS-REFERENCE TO RELATED APPLICATIONS

This application claims benefit of U.S. Provisional Patent Application Ser. No. 61/766,197, filed Feb. 19, 2013, which is incorporated herein by reference.

FIELD

Embodiments described herein relate to methods of manufacturing magnetic media. More specifically, embodiments described herein relate to patterning of magnetic media by plasma exposure.

BACKGROUND

Magnetic media are used in various electronic devices such as hard disk drives and magnetoresistive random access memory (MRAM) devices. Hard-disk drives are the storage medium of choice for computers and related devices. They are found in most desktop and laptop computers, and may also be found in a number of consumer electronic devices, such as media recorders and players, and instruments for collecting and recording data. Hard-disk drives are also deployed in arrays for network storage. MRAM devices are used in various non-volatile memory devices, such as flash drives and dynamic random access memory (DRAM) devices.

Magnetic media devices store and retrieve information using magnetic fields. The disk in a hard-disk drive is configured with magnetic domains that are separately addressable by a magnetic head. The magnetic head moves into proximity with a magnetic domain and alters the magnetic properties of the domain to record information. To recover the recorded information, the magnetic head moves into proximity with the domain and detects the magnetic properties of the domain. The magnetic properties of the domain are generally interpreted as corresponding to one of two possible states, the "0" state and the "1" state. In this way, digital information may be recorded on the magnetic medium and recovered thereafter.

Magnetic storage media typically comprise a non-magnetic glass, composite glass/ceramic, or metal substrate with a magnetically active material deposited thereon. The magnetically active material is generally either deposited to form a pattern, or is patterned after deposition, such that the surface of the device has areas of magnetic activity interspersed with areas of magnetic inactivity.

Recently, storage densities have increased, resulting in a migration from the historical method of patterning magnetic media according to concentric tracks toward a bit-patterned arrangement. The magnetically active layer, or a portion thereof, is subjected to a process that produces areas of magnetic activity like islands surrounded by areas of magnetic inactivity. Such methods are enabling progress in storage density beyond 1 TB/in$^2$, but other challenges loom as the dimension of the islands shrinks.

More recent patterning methods rely on physical patterning, such as nanoimprint patterning, to produce a pattern having the requisite dimension. Such patterning relies on an imprintable medium that is frequently vulnerable to subsequent processing that transfers the pattern to subjacent layers. Pattern degradation during such subsequent processes may be extreme. Thus, there is a need for a process or method of patterning magnetic media, and an apparatus for performing the process or method efficiently for high volume manufacturing.

SUMMARY

Embodiments described herein provide a method of forming a patterned magnetic substrate by forming a patterned resist having thick portions and thin portions on a magnetically active surface of a substrate, forming an oxide layer over the patterned resist by a flowable CVD process, exposing portions of the patterned resist by etching the oxide layer to form an etched oxide layer, exposing portions of the magnetically active surface by etching the patterned resist using the etched oxide layer as a mask to form an etched resist layer, modifying a magnetic property of the exposed portions of the magnetically active surface by directing energy through the etched resist layer and the etched oxide layer, and removing the etched resist layer and the etched oxide layer from the substrate.

An apparatus for processing a substrate is also described having a substrate handling portion coupled to a substrate processing portion by one or more load-lock chambers, the substrate processing portion comprising a flowable CVD chamber, a plasma etch chamber and one or more plasma immersion chambers coupled to a transfer chamber, and the substrate handling portion comprising a loading portion, a transfer portion, and an interface portion.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 is a plan view of an apparatus according to another embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments described herein generally provide methods and apparatus for forming a patterned magnetic substrate that may be used for any purpose to which such substrates may be directed, including magnetic storage. Some embodiments form substrates for hard disk drives, while other embodiments may form static storage devices such as MRAM devices.

Figure 1:
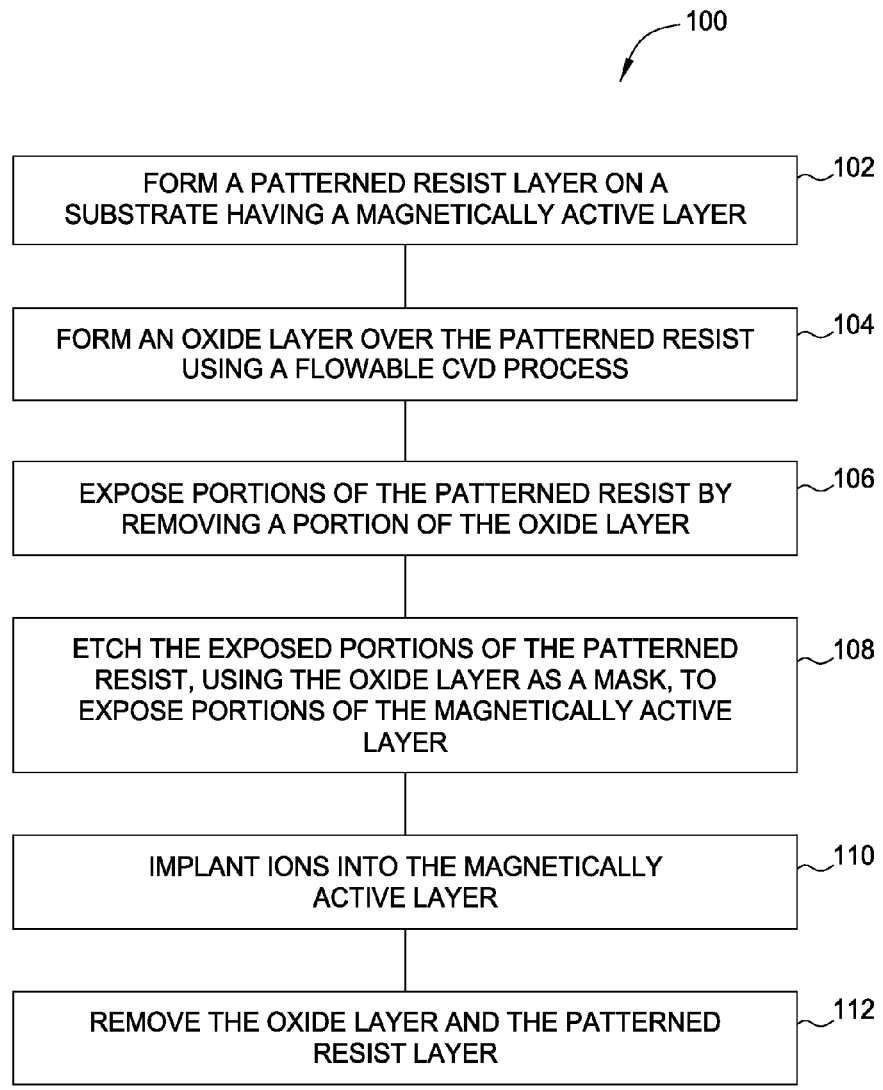
FIG. 1 is a flow diagram summarizing a method according to one embodiment.

FIG. 1 is a flow diagram summarizing a method 100 according to one embodiment. The method 100 of FIG. 1 is used to form a substrate having a pattern of magnetic properties defined according to a pattern formed in a resist layer applied to the substrate and then subsequently removed. The pattern of magnetic properties results in a substrate with magnetic domains having a dimension less than about 25 nm with very smooth topography.

In FIG. 1, a patterned magnetic substrate is produced by forming a patterned resist layer on a substrate having a magnetically active layer, at 102. A magnetically active layer is a layer having a detectable magnetic property. The substrate is a structural substrate having mechanical strength to support the overlying layers. Substrates used are generally metal, glass, or a carbon material such as a polymer or composite, and may be metal alloys or composite glass materials such as glass/ceramic blends. The substrate is generally magnetically impermeable with diamagnetic, or only very weak paramagnetic, properties. For example, in some embodiments, the magnetic susceptibility of the base layer is below about $10^{-4}$ (the magnetic susceptibility of aluminum is about $1.2 \times 10^{-5}$).

The magnetically active layer generally includes a magnetically susceptible material that provides a medium for magnetic patterning. The magnetically susceptible material may be formed in multiple layers, each layer having the same or different composition. In one embodiment, a first layer of soft magnetic material having weak magnetic properties, such as coercivity or susceptibility, is formed on the base substrate, directly on the base substrate or on layers formed on the base substrate, and a second layer of hard magnetic material having stronger magnetic properties is formed directly on the first layer or on other layers formed on the first layer. In some embodiments, each layer comprises one or more elements selected from the group consisting of cobalt, platinum, nickel, molybdenum, chromium, tantalum, iron, terbium, and gadolinium. In one embodiment, the magnetically active layer comprises a first layer of iron or iron/nickel alloy having a thickness between about 100 nm and about 1,000 nm (1 μm) and a second layer comprising two sub-layers, each having a thickness between about 30 nm and about 70 nm, such as about 50 nm, and each comprising chromium, cobalt, and platinum. These layers may be formed by any suitable method known to the art, such as physical vapor deposition, or sputtering, chemical vapor deposition, plasma-enhanced chemical vapor deposition, spin-coating, plating by electrochemical or electroless means, and the like.

The patterned resist layer may be formed by applying a resist material to the substrate and patterning the resist layer by a physical or lithographic patterning process capable of producing features having a dimension of about 50 nm or less in some embodiments, 25 nm or less in some embodiments, and 10 nm or less in some embodiments. The resist material may be a material that can be readily removed without affecting the underlying magnetically susceptible material, or a material that may be left in the finished device without adversely affecting its properties. For example, in many embodiments, the resist material is soluble in a solvent liquid, such as water or hydrocarbon. In some embodiments, the resist material is applied to the substrate as a curable liquid, patterned by physical imprint with a template, and cured by heating or UV exposure. In other embodiments, the resist material is applied to the template and at least partially cured before applying the coated template to the substrate to transfer the resist material to the substrate. The resist material is generally also resistant to degradation by incident energy or energetic ions. In some embodiments, the resist material is a curable material, such as an epoxy or thermoplastic polymer, that will flow prior to being cured and will provide some resistance to energetic processes after curing.

The template is generally formed from a durable material that will retain its shape through multiple cycles of imprinting a mask material. In some embodiments, the template comprises aluminum. Features formed on the template may have dimensions less than about 50 nm, such as less than about 25 nm, or even less than about 10 nm. In some embodiments, features having dimensions between about 1 nm and about 10 nm may be formed in the template. The very small dimension features may be formed using any process suitable for forming such small features in a substrate. One example of such a process is electron beam writing. Ion beam or molecular beam writing may be used in some other embodiments.

The patterned resist material defines masked and unmasked portions of the magnetically active layer, and defines the pattern to be used to create a pattern of magnetic properties on the substrate. The pattern formed in the resist material generally results in portions of the magnetically active layer covered by a thin layer of resist material, or no resist material, and other portions covered by a thick layer of resist material. The portions covered by a thin layer, or no layer, of resist correspond to the unmasked portions, and may be subsequently treated by exposure to a processing environment selected to penetrate the thin resist layer without penetrating the thick resist layer. In some embodiments, the thick resist layer may have a thickness between about 50 nm and about 150 nm, such as between about 60 nm and about 100 nm, for example about 80 nm. In some embodiments, the thin resist layer may have a thickness between about 0 nm and about 20 nm, such as between about 2 nm and about 10 nm, for example about 5 nm.

A suitable resist material for practicing embodiments described herein is the Monomat resist available from Molecular Imprints, Inc., of Austin, Tex. The Monomat resist may be used in an imprinting process as described above implemented using one of the J-FIL™ imprinters, also available from Molecular Imprints, Inc.

In other embodiments, the resist material may be a photoresist material such as the Advanced Patterning Film amorphous carbon resist material applied using a CVD process implemented on the PRODUCER® CVD system available from Applied Materials, Inc., of Santa Clara, Calif.

A hardmask may be used between the resist material and the magnetically susceptible material in some embodiments. The hardmask may be a material that is chemically and structurally compatible with the resist material. Chemical compatibility simplifies removing the resist material and the hardmask after patterning. Structural compatibility reduces pattern drift due to interfacial forces between the hardmask material and the resist material. The hardmask may also be a material that is chemically incompatible with the resist material in some cases. Chemical incompatibility enables use of a chemistry selective to the hardmask material, rather than the resist material, which simplifies transferring a pattern formed in the resist material into the hardmask. Removal of the resist and the hardmask is complicated by such chemical incompatibility, however, because two different chemistries must be used to remove the two layers. In most cases, the resist material is an arrangement of carbon, as noted above. Exemplary hardmask materials that may be used include carbon, such as amorphous carbon, silicon, such as polycrystalline silicon, and titanium nitride. The hardmask material may be formed on the magnetically susceptible material using any suitable process, so long as the magnetically susceptible material is maintained at a temperature that does not adversely impact its magnetic properties.

At 104, an oxide layer is formed over the patterned resist by a flowable or a flow-like CVD process. The oxide layer is typically formed in a blanket fashion, filling the recesses of the patterned resist and covering the raised portions of the patterned resist. The oxide layer is harder than the resist layer, so the oxide layer reduces or prevents damage to the resist layer, and resulting pattern degradation, during subsequent processing.

An exemplary process for forming an oxide layer over the patterned resist includes reaction of an organosilicon precursor and an oxygen precursor at a temperature of about 100° C. or less to form a flowable oxide layer. Suitable organosilicon precursors have a ratio of carbon atoms to silicon atoms less than 8. Suitable organosilicon compounds may also have a ratio of oxygen to silicon atoms of 0 to about 6, and may include an Si—O—Si linkage that facilitates formation of $SiO_x$ films with reduced contamination from carbon and hydroxyl groups.

Suitable organosilicon compounds may be siloxane compounds, such as triethoxysiloxane, tetramethoxysiloxane, trimethoxysiloxane, hexamethoxydisiloxane, octamethoxytrisiloxane, and/or octamethoxydodecasiloxane, silazoxane compounds having one or more nitrogen groups, such as hexamethoxydisilazoxane, methyl hexamethoxydisilazoxane, chlorohexamethoxydisilazoxane, hexaethoxydisilazoxane, nonamethoxytrisilazoxane, and octamethoxycyclosilazoxane, halogenated siloxane compounds that include one or more halogen groups (e.g., fluoride, chloride, bromide, or iodide groups), such as tetrachlorosilane, dichlorodiethoxysiloxane, chlorotriethoxysiloxane, hexachlorodisiloxane, and/or octachlorotrisiloxane, and aminosilanes, such as trisilylamine, hexamethyldisilazane, silatrane, tetrakis(dimethylamino)silane, bis(diethylamino)silane, tris(dimethylamino)chlorosilane, and methylsilatrane. Suitable organosilicon compounds may also be disilanes, such as alkoxy disilanes, alkoxy-alkyl disilanes, and alkoxy-acetoxy disilanes, including compounds having the general structure

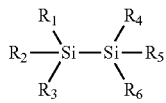

where $R_1$-$R_6$ may be, independently, a $C_{1-3}$ alkoxy group, a $C_{1-3}$ alkyl group, or an acetoxy group, wherein at least one of $R_{1-6}$ is an alkoxy group or an acetoxy group. Suitable organosilicon compounds also include cyclic disilanes with alkyl and alkoxy moieties, such as butasilanes, pentasilanes, hexasilanes, heptasilanes, octasilanes, and the like, having at least one alky and alkoxy group. Examples include octamethyl-1,4-dioxa-2,3,5,6-tetrasilacyclohexane; 1,4-dioxa-2,3,5,6-tetrasilzcyclohexane; and 1,2,3,4,5,6-hexamethoxy-1,2,3,4,5,6-hexamethylcyclohexasilane, among other alkoxyalkylcyclosilanes. Suitable organisilicon compounds also include organocyclosilanes such as cyclobutasilane, cyclopentasilane, cyclohexasilane, cycloheptasilane, cyclooctasilane, and other similar compounds.

The oxygen precursor may include molecular oxygen ($O_2$), ozone ($O_3$), a nitrogen-oxygen compound such as NO, $NO_2$, or $N_2O$, a hydrogen-oxygen compound such as water or peroxide, a carbon-oxygen compound such as carbon monoxide or carbon dioxide, and other oxygen-containing precursors. The oxygen precursor may also include atomic oxygen and/or oxygen radicals that are generated remotely and introduced with the organosilicon precursor. A carrier gas, such as helium, neon, argon, and/or hydrogen may be mixed with the organosilicon precursor, the oxygen precursor, or both, if desired. The oxygen precursor may be activated prior to introduction to the deposition chamber, for example using a remote plasma generator, which may include thermal dissociation, ultraviolet light dissociation, RF, DC, and/or microwave dissociation. In one embodiment, 4-6 kW of RF power may be coupled into a flow of 900-1,800 sccm of argon and 600-1,200 sccm of molecular oxygen.

The organosilicon precursor and the oxygen precursor are typically introduced to a deposition chamber by different pathways to avoid reactions outside the deposition chamber. The organosilicon precursor may be introduced as a gas to the deposition chamber at a liquid-equivalent flow rate of about 800 mgm to about 1,600 mgm. Helium may be included as a carrier gas at a flow rate of about 600 sccm to about 2,400 sccm. An activated oxygen precursor may be introduced to the deposition chamber at a flow rate between about 3 sLm and about 20 sLm. The precursors react to deposit a flowable oxide layer on a substrate having a patterned resist material. The flowable oxide flows to fill the recesses in the patterned resist. In one embodiment, a flowable oxide layer, which may be silicon oxide, is deposited to a thickness of 200-400 Å to cover the raised portions of the resist material.

In another embodiment, a first silicon-containing precursor, a second silicon-containing precursor, and an ammonia plasma can be reacted to form a flowable oxide layer. The first silicon-containing precursor may contain Si—H bonds and/or Si—Si bonds, may be reactive with an ammonia plasma, and may have a ratio of carbon atoms to silicon atoms of about 8 or less. Examples of the first silicon-containing precursor include trimethoxysiloxane (TMOS), hexachlorodisiloxane (HCDS), bis-diethylaminosilane, tetramethylcyclotetrasiloxane (TMCTS), and bis-tert-butylaminosilane (BTBAS). The second silicon-containing precursor may contain a Si—N bond. Examples of the second silicon-containing precursor include trisilylamine, which may be methyl substituted. The ammonia plasma may be formed in a remote chamber, and the first and second silicon-containing precursors may be mixed or separately introduced into the deposition chamber to interact with the ammonia plasma.

Tetramethyldisiloxane (TMDSO) and trisylylamine (TSA) may be used to form a silicon oxide at a processing temperature between about −10° C. and about 100° C., such as between about 30° C. and about 70° C., for example about 40° C., and pressure of about 1.5 Torr. TSA may be provided at a flow rate between about 10 sccm and about 550 sccm, such as between about 400 sccm and about 430 sccm, for example about 400 sccm. TMDSO may be provided at a flow rate between about 10 mgm and about 1,500 mgm, for example about 1,000 mgm. Ammonia may be provided to a plasma generator at a flow rate between about 1000 sccm and about 1,250 sccm.

The flowable oxide layer is typically cured following deposition to remove moisture and residual organics, harden, and densify the layer. The curing is typically performed using low temperature processes that maintain the magnetically active material at a temperature of about 100° C. or less. Such processes include exposure to inductively coupled plasma, ultraviolet light, ozone, e-beam, acidic or basic vapors, an aqueous environment such as heated deionized water, and a combination or succession of such treatments. To facilitate curing, the flowable oxide layer may be heated to a temperature of about 150° C. or less by surface heating methods so that the patterned resist layer insulates the magnetically active material from the warm oxide layer. Such surface heating methods include exposure to infrared or heat lamps and proximity to a hot chamber surface, such as a showerhead. If the substrate is positioned on a substrate support with capability to cool the magnetically active material, the flowable oxide layer may be heated to higher temperatures, depending on the cooling capacity of the substrate support.

In other embodiments, curing the oxide layer may be performed by heating the substrate using a heat source applied to the surface of the substrate opposite the oxide layer. For example, the substrate may be disposed on a heated substrate support, and to cure the oxide layer the substrate may be heated to a temperature between about 100° C. and about 150° C. by heating the substrate support.

The flowable oxide layer used herein may be partially cured, if desired, to reduce curing time or to achieve certain desired properties of the cured oxide layer. It is typically desired that the flowable oxide layer be cured to an extent sufficient to allow a pattern to be formed and maintained by the cured oxide layer without flowing. If curing is expressed as a percentage referring to moisture plus organics remaining in the layer after curing divided by original moisture plus organics, with 0% referring to an uncured layer, such as a flowable oxide layer as deposited, and 100% referring to a layer that has been cured to the extent that all moisture and organics have been removed, the flowable oxide layer used herein is typically cured to at least about 40%, such as between about 50% and about 95%, for example about 90%.

A flowable or flow-like oxide layer may be formed using a high-density plasma CVD system, a plasma enhanced CVD system, and/or a sub-atmospheric CVD system, among other systems. Examples of CVD systems capable of forming a flowable or flow-like oxide layer include the ULTIMA HDP CVD® system and ETERNA CVD® on the PRODUCER® system, both available from Applied Materials, Inc., of Santa Clara, Calif. Other CVD systems from other manufacturers may also be used.

At 106, the oxide layer, formed by deposition and curing as described above at 104, is etched to expose portions of the patterned resist material. A low temperature process, such as the SICONI® process of Applied Materials, may be used to etch the oxide layer. Temperature is typically maintained at about 100° C. or less. Other low temperature methods may include vapors of flourine containing compounds such as HF, $NF_3$, and fluorocarbons, which may be activated remotely, or in situ by inductive means. The oxide layer is etched until the raised portions of the patterned resist are exposed and openings are formed in the oxide layer. The substrate is left with a surface that has regions of resist material separated by regions of oxide material. The oxide material constitutes an oxide layer having openings.

At 108, the patterned resist is etched using a carbon-selective chemistry such as activated oxygen in a low temperature process. The oxide material interspersed between the raised portions of the patterned resist serves as a mask for etching. An oxygen precursor may be activated remotely by exposure to RF, DC, microwave, UV, or thermal energy, as described above, and the activated oxygen directed to the substrate to react with the carbon in the patterned resist. The etchant attacks the exposed portions of the resist through the openings in the oxide layer, removing material until the underlying layer is exposed, forming openings in the patterned resist layer. If a hardmask material is used that has a chemistry compatible with the resist material, etching may continue through the hardmask material to expose the underlying magnetically active material. For example, if the patterned resist is a carbon material and the hardmask is amorphous carbon, the same oxygen chemistry may be continued to etch through the patterned resist and the amorphous carbon, according to the pattern of the oxide, to expose the magnetically active material. If a hardmask material is used that is not chemically compatible with the resist material, etching will substantially cease when the hardmask layer is exposed, and then etching is continued using a chemistry selective to the hardmask material.

At 110, ions are implanted into the magnetically active layer. The ions may be delivered by plasma or by ion beam. In a plasma process, the substrate may be immersed in a plasma. The substrate may also be biased. The ions penetrate into the magnetically active layer in the exposed portions, through the openings in the oxide layer and the openings in the patterned resist (and the openings in the hardmask, if used), disrupting alignment of atomic and/or molecular magnetic moments to change magnetic coercivity, susceptibility, or other magnetic properties in the unmasked portions. In some embodiments, the magnetically active layer is demagnetized in the exposed portions, resulting in no detectable residual magnetic field in the exposed portions. In other embodiments, magnetization is reduced between about 50% and about 95%.

At 112, the oxide layer and remaining patterned resist layer are removed. Any process that removes the layers without altering or damaging the magnetic pattern formed in the magnetically active layer may be used. In one instance, a fluorine-containing plasma may be used to strip the oxide layer and the patterned resist in a single operation. Chemistries similar to those described above for etching the oxide layer may be used to strip the oxide layer. The carbon resist may also be removed using an oxygen stripping chemistry, or using a solvent such as an alcohol or hydrocarbon solvent.

Figure 2A:
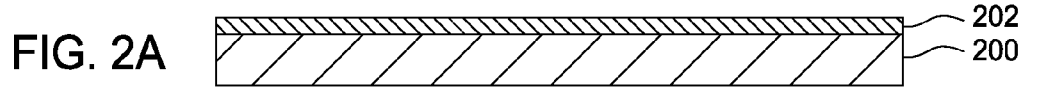
FIGS. 2A-2I show a substrate in various stages undergoing the method of FIG. 1.
Figure 2B:
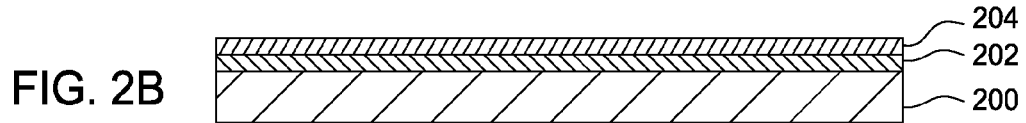
Figure 2C:
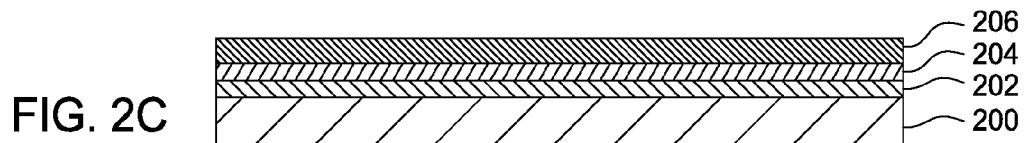

FIGS. 2A-2I are a progressive illustration of a substrate 200, with a magnetically active layer 202, in various stages undergoing the method of FIG. 1. The structure shown in FIG. 2A is subjected to operation 102 of the method 100. In FIG. 2B, an optional hardmask material 204 is formed on the magnetically active layer 202, substantially as described in connection with operation 102 above. In FIG. 2C, a resist material 206 is formed on the hardmask material 204. The hardmask material 204 and the resist material 206 may be formed substantially as described in connection with the operation 102 above. The resist material 206 may have a thickness as described above, and the hardmask material 204 may have a thickness that is similar to the thickness of the resist material 206. The hardmask material 204 may also be thicker or thinner than the resist material 206. In most cases, the hardmask material 204 will have a thickness that is the same as, or less than, a dimension of the magnetic pattern to be formed in the magnetically active layer 202.

Figure 2D:
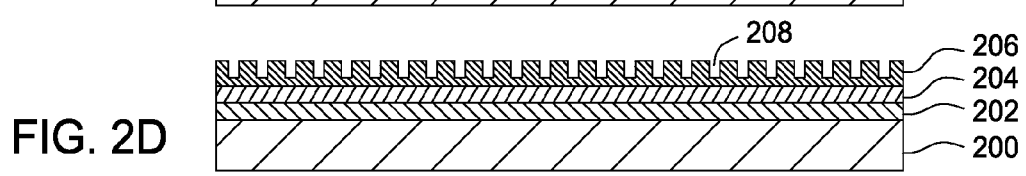

FIG. 2D shows a pattern formed in the resist material 206. Openings 208 are formed with dimension typically about 25 nm or less. Such openings may be formed as described in connection with operation 102 above. The pattern formed in the resist material 206 provides the patterning template ultimately used to create a pattern of magnetic properties in the magnetically active layer 102.

Figure 2E:
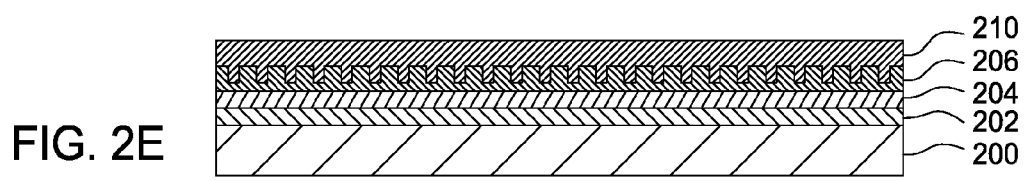
Figure 2F:
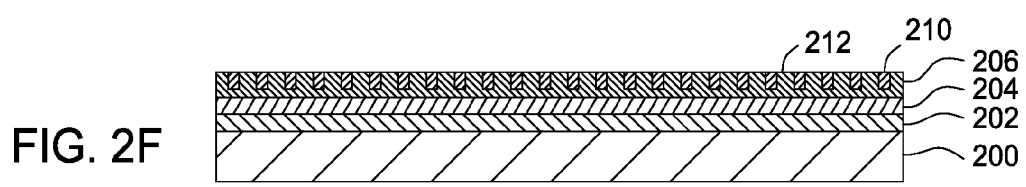

FIG. 2E shows an oxide layer 210 formed over the patterned resist material 206, flowing into and filling the openings 208. The oxide layer 210 is formed substantially as described in connection with operation 104 above. FIG. 2F shows the substrate after the oxide layer 210 has been reduced to expose portions 212 of the patterned resist material 206, as described in operation 106.

Figure 2G:
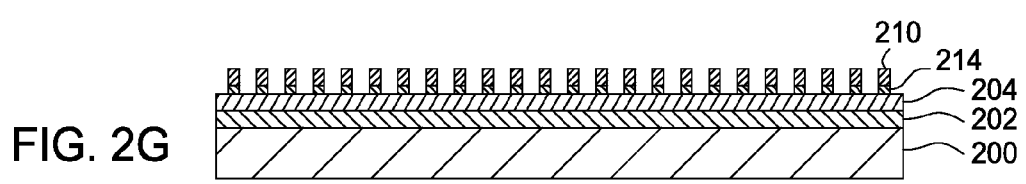

FIG. 2G shows the substrate after the patterned resist material 206 has been etched between the remaining oxide features 210. Portions 214 of the patterned resist material that are covered by the oxide 210 remain, and the hardmask material 204 is exposed between the oxide/resist features.

Figure 2H:
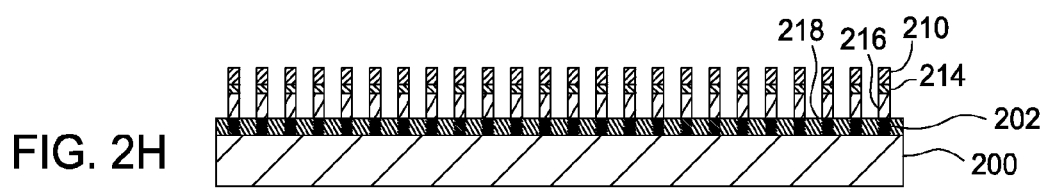

FIG. 2H shows the substrate after the hardmask material 204 has been opened using the oxide/resist features as a mask.

Portions 216 of the hardmask material covered by the oxide/resist features remain, and the magnetically active layer 202 is exposed between the remaining oxide/resist/hardmask features. Exposed areas 218 of the magnetically active layer 202 are treated as described in operation 110 above to alter a magnetic property of the exposed areas 218. Areas of the magnetically active layer 202 covered by the oxide/resist/hardmask features are substantially unchanged. The topology of the magnetically active layer 202 is also substantially unchanged by the treatment.

Figure 2I:
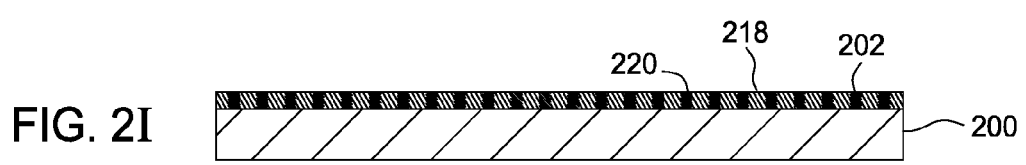

FIG. 2I shows the substrate with the magnetically active layer 202 that has a pattern of magnetic properties. Regions 218 with an altered magnetic property are separated from regions 220 that are substantially unchanged. The regions 218 and the regions 220 have dimensions that are related to the pitch of the pattern originally formed in the resist material 206. Typically, a citical dimension of the features of the patterned magnetically active layer 202 is no more than about 25 nm, such as between about 1 nm and about 20 nm, for example about 10 nm.

Figure 3:
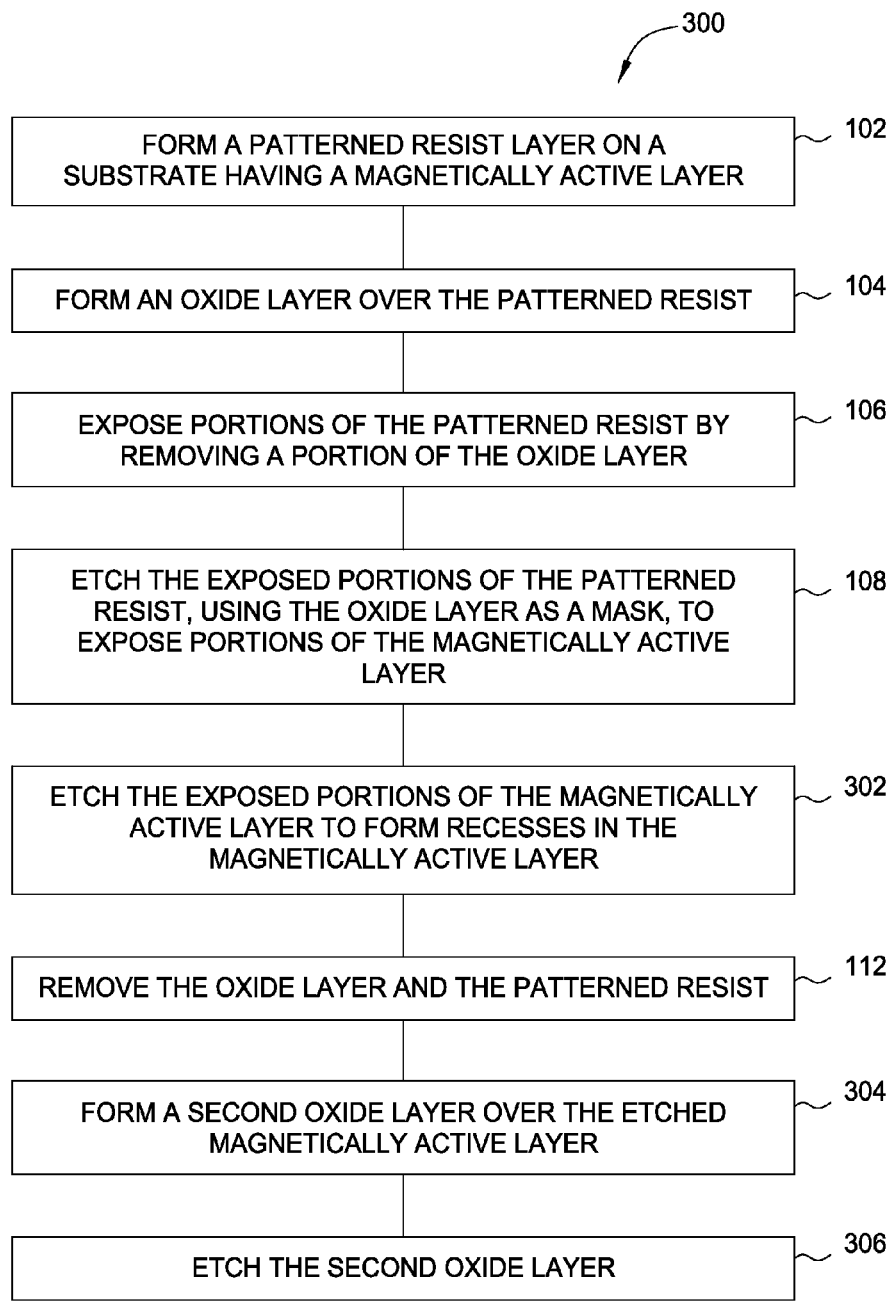
FIG. 3 is a flow diagram summarizing a method according to another embodiment.

FIG. 3 is a flow diagram summarizing a method 300 according to another embodiment. The method 300 is similar in many respects to the method 100 of FIG. 1, and the same elements appearing in the method 100 and the method 300 are identified by the same numerals. Operations 102, 104, 106, and 108 are the same, preparing a substrate with a magnetically active layer and a patterned mask. At 302, the substrate is exposed to an etching process to remove portions of the magnetically active layer to form recesses in the magnetically active layer. The etching process may be an ion milling or sputtering process or a reactive ion etch process, for example using a fluorine based chemistry. The recesses thus formed may have a ratio of depth to width that is between about 0.1 and about 5.0, such as between about 0.5 and about 2.0, for example about 1.0, to facilitate forming magnetically inactive "islands" between the remaining, unetched magnetically active domains.

The etched oxide layer and etched resist are removed by operation 112, which is described above. It should be noted that a hardmask material may be used in the method 300 as in the method 100. At 304, a second oxide layer may be formed over the etched magnetically active layer, after removal of the patterning layers at 112. The second oxide layer may be formed using a flow-like or flowable CVD process, substantially as described above. As described above, low-temperature processes are generally used so that the magnetically active material is not heated above about 100° C. In this operation, because the second oxide layer is formed directly on the magnetically active material, the curing operation is performed at temperatures of about 100° C. or less, since there is no intervening layer. The second oxide is formed to a thickness of 200-400 Å, filling the recesses and covering the magnetically active material. At 306, the second oxide layer is etched to expose the raised portions of the magnetically active material using any suitable oxide etch process, many of which are described elsewhere herein. The result is a substrate having a surface with a pattern of magnetic properties characterized by regions of magnetically active material separated by regions of flowable oxide, which is a magnetically inactive material.

Figure 4A:
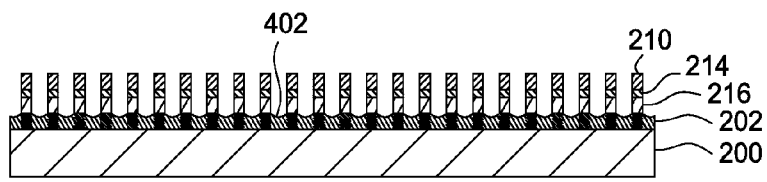
FIGS. 4A-4C show a substrate in various stages undergoing the method of FIG. 3.
Figure 4B:
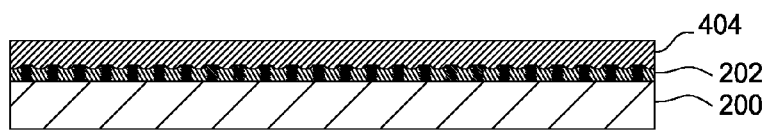
Figure 4C:
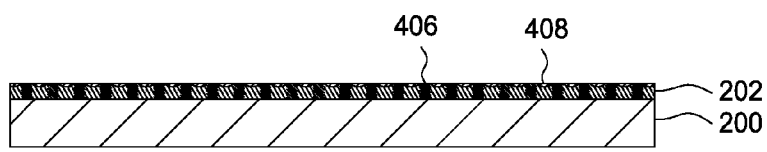

FIGS. 4A-4C are a progressive illustration of the substrate 200 in various stage undergoing the method 300 of FIG. 3. Because the method 300 of FIG. 3 includes operations 102, 104, 106, and 108 from the method 100 of FIG. 1, FIG. 4A shows a substrate 200 having undergone the operations 102, 104, 106, 108, and 302. Thus, in FIG. 4A, the structure of FIG. 2G is subjected to a process to open the hardmask material 204, as described above, and the magnetically active layer 202 is etched to form recesses 402 between the oxide/resist/hardmask features. The oxide/resist/hardmask features are made up of portions 210 of the oxide layer stacked on portions 214 of the resist material stacked on portions 216 of the hardmask material, as described above. The oxide/resist/hardmask features serve as a mask for etching the magnetically active layer 202 to form the recesses 402. The recesses 402 may have a depth that is less than the thickness of the magnetically active layer 202, or a depth that is equal to or greater than the thickness of the magnetically active layer 202. In some cases, the magnetically active layer 202 is over-etched to propagate the recesses into the material of the substrate 200. The recesses 402 may have a width that is less than, equal to, or greater than the pattern pitch of the oxide/resist/hardmask features depending on how the etch is performed. In most cases, the recesses 402 have a width that is equal to or less than the pattern pitch.

FIG. 4B shows the substrate after the oxide/resist/hardmask features have been removed by etching, and a second oxide layer 404 is formed over the patterned magnetically active layer 202. The oxide material of the second oxide layer 404 flows into and fills the recesses 402, as described above in connection with operation 304. FIG. 4C shows the substrate after the oxide layer 404 has been reduced to expose regions 406 of the magnetically active layer 202. The remaining oxide 408 fills the recesses to form regions having a magnetic property that is different from the exposed regions 406 of the magnetically active layer 202. In this way, a pattern of magnetic properties is formed in the magnetically active layer 202, substantially without altering the topography of the surface of the magnetically active layer 202. As mentioned above, the exposed regions 406 of the magnetically active layer 202 have a dimension that is related to the pitch of the pattern originally formed in the resist material. The dimension is typically less than about 25 nm, such as between about 1 nm and about 20 nm, for example about 10 nm.

The methods 100 and 300 of FIGS. 1 and 3 enable finer patterning of magnetic substrates than conventional processes because the physical patterning process produces a pattern having smaller dimensions than are produced by most lithographic, or chemical patterning processes. The flowable oxide reproduces the pattern in the resist by flowing into the openings in the pattern. Curing the flowable oxide hardens the oxide into a durable mask for etching and magnetic patterning.

FIG. 5 is a schematic plan view of an apparatus 500 that may be used to perform embodiments described herein. The apparatus 500 comprises a substrate handling portion 502 and a substrate processing portion 504. The substrate handling portion 502 comprises a loading station 506, a transfer station 508, and an interface station 510. Substrates are loaded into the apparatus 500 at the loading station 506. In some cases, the loading operation may comprise disposing one or more substrates on a carrier for transport through the apparatus 500. The transfer station 508 moves substrates from the loading station 506 to the interface station 510. The transfer station 508 may comprise substrate handling features, such as flippers, if desired. The interface station 508 provides substrates to an entry load-lock chamber 512 for entry to the substrate processing portion 504, which generally operates under vacuum. The substrate processing portion 504 comprises a plurality of substrate processing chambers 516 coupled to a transfer chamber 520 with a transfer robot 518 disposed therein. Each of the processing chambers 516 may be a low temperature CVD chamber, a high-density plasma CVD chamber, a PECVD chamber, an etch chamber, a cure chamber, a plasma cleaning chamber, or a plasma immersion chamber. In one embodiment, the chambers 516 include a plasma CVD chamber that forms a hardmask layer and/or a flowable oxide layer, a plasma etch chamber that can etch carbon layers and silicon oxide layers, and a plasma immersion chamber that can change the magnetic properties of a magnetically active surface of a substrate. The plasma CVD chamber may be an HDP CVD chamber, and the plasma etch chamber may be a remote plasma chamber with fluorine and oxygen precursors coupled thereto for silicon oxide and carbon etching, respectively. An exit load-lock chamber 514 receives processed substrates for transfer back to the substrate handling portion 502.

In embodiments featuring a plurality of substrates disposed on a substrate carrier for processing, each of the processing chambers 516 may process a plurality of substrates at the same time. When the apparatus 500 is used to practice the methods 100 and 200, any or all of forming the oxide layer at 104 and 204, removing a portion of the oxide layer at 106 and 206, etching the patterned resist at 108 and 208, etching the exposed portions of the magnetically active layer at 210, implanting ions into the magnetically active layer at 110, removing the oxide layer and the patterned resist at 112 and 212, forming the second oxide layer at 214 and etching the second oxide layer at 216 may be performed on a plurality of substrates simultaneously.

While the foregoing is directed to embodiments of the invention, other and further embodiments of the invention may be devised without departing from the basic scope thereof.

What is claimed is:

1. A method of forming a patterned magnetic substrate, comprising:
    forming a patterned resist on a magnetically active surface of a substrate;
    forming an oxide layer on the patterned resist by a flowable CVD process;
    exposing portions of the patterned resist by etching the oxide layer to form an etched oxide layer having openings;
    exposing portions of the magnetically active surface by etching the patterned resist using the etched oxide layer as a mask to form an etched resist layer having openings;
    modifying a magnetic property of the exposed portions of the magnetically active surface by directing energy through the openings of the etched resist layer and the openings of the etched oxide layer; and
    removing the etched resist layer and the etched oxide layer from the substrate.

2. The method of claim 1, wherein forming the patterned resist comprises a physical patterning process.

3. The method of claim 1, wherein the flowable CVD process comprises reacting a silicon containing precursor having a ratio of carbon to silicon atoms that is less than about 8 with an oxygen precursor at a temperature of about 100° C. or less.

4. The method of claim 1, wherein the flowable CVD process comprises reacting a silicon containing precursor with an oxygen precursor to form a flowable oxide layer and curing the flowable oxide layer at a temperature that is less than about 150° C. to form the oxide layer.

5. The method of claim 2, wherein the physical patterning process is a nano-imprint process, and the flowable CVD process comprises reacting a silicon containing precursor having a ratio of carbon to silicon atoms that is less than about 8 with an oxygen precursor at a temperature of about 100° C. or less.

6. The method of claim 4, wherein the flowable CVD process is a plasma process.

7. The method of claim 4, wherein curing the flowable oxide layer comprises exposing the flowable oxide layer to inductively coupled plasma, ultraviolet light, ozone, e-beam, acidic vapors, basic vapors, or a combination thereof.

8. The method of claim 1, wherein directing energy through the openings of the patterned resist layer and the openings of the oxide layer comprises immersing the substrate in a plasma.

9. The method of claim 1, wherein the directed energy comprises ions, neutrals, radicals, photons, electrons, or a combination thereof.

10. The method of claim 1, wherein the directed energy comprises fluorine containing ions.

11. The method of claim 1, wherein exposing portions of the magnetically active surface to directed energy through the openings in the etched resist layer and the openings in the etched oxide layer comprises:
    providing a fluorine containing gas mixture to a processing chamber with an inductive plasma source;
    generating a plasma from the fluorine containing gas; and
    directing ions from the plasma toward the substrate.

12. The method of claim 4, wherein exposing portions of the magnetically active surface to directed energy through the openings in the etched resist layer and the openings in the etched oxide layer comprises:
    providing a fluorine containing gas mixture to a processing chamber with an inductive plasma source;
    generating a plasma from the fluorine containing gas; and
    directing ions from the plasma toward the substrate at an energy selected to implant into the magnetically active surface without traveling through the etched resist layer.

13. A method of forming a patterned magnetic substrate, comprising:
    forming a patterned resist having thick portions and thin portions on a magnetically active surface of a substrate;
    forming an oxide layer over the patterned resist by a process, comprising:
        reacting a silicon containing precursor with an oxygen precursor to form a flowable oxide layer; and
        curing the flowable oxide layer at a temperature that is less than about 150° C. to form the oxide layer;
    exposing portions of the patterned resist by etching the oxide layer to form an etched oxide layer having openings;
    exposing portions of the magnetically active surface by etching the patterned resist using the etched oxide layer as a mask to form an etched resist layer having openings;
    modifying a magnetic property of the exposed portions of the magnetically active surface by directing energy through the openings of the etched resist layer and the openings of the etched oxide layer; and
    removing the etched resist layer and the etched oxide layer from the substrate.

14. The method of claim 13, wherein reacting the silicon containing precursor with the oxygen precursor to form the flowable oxide layer is performed using a plasma.

15. The method of claim 13, wherein curing the flowable oxide layer comprises exposing the flowable oxide layer to inductively coupled plasma, ultraviolet light, ozone, e-beam, acidic vapors, basic vapors, or a combination thereof.

16. The method of claim 13, wherein reacting the silicon containing precursor with the oxygen precursor to form the flowable oxide layer is performed using a plasma, curing the flowable oxide layer comprises exposing the flowable oxide layer to inductively coupled plasma, ultraviolet light, ozone, e-beam, acidic vapors, basic vapors, or a combination thereof, and directing energy through the openings of the patterned resist layer and the openings of the oxide layer comprises immersing the substrate in a plasma.

* * * * *

UNITED STATES PATENT AND TRADEMARK OFFICE
CERTIFICATE OF CORRECTION

PATENT NO. : 8,986,557 B2  Page 1 of 1
APPLICATION NO. : 14/177893
DATED : March 24, 2015
INVENTOR(S) : Underwood et al.

It is certified that error appears in the above-identified patent and that said Letters Patent is hereby corrected as shown below:

<u>In the Specification</u>

Column 9, Line 17, please delete "citical" and insert --critical-- therefor.

Signed and Sealed this
Eighth Day of September, 2015

Michelle K. Lee
*Director of the United States Patent and Trademark Office*